United States Patent [19]
Schuman

[11] 3,965,608
[45] June 29, 1976

[54] MANUALLY OPERATED SUCTION DEVICE FOR CAPTURING SMALL OBJECTS

[76] Inventor: Mark Schuman, 101 G. St., Southwest, Apt. 516, Washington, D.C. 20024

[22] Filed: May 1, 1974

[21] Appl. No.: 466,063

Related U.S. Application Data

[63] Continuation-in-part of Ser. No. 270,542, July 10, 1972, abandoned.

[52] U.S. Cl. ................................. 43/110; 15/341; 15/344; 43/139; 124/65; 228/20
[51] Int. Cl.² ........................................ A01M 3/00
[58] Field of Search ................ 43/134, 110, 139, 4; 124/13 A; 15/344, 341; 228/20

[56] References Cited
UNITED STATES PATENTS

| | | | |
|---|---|---|---|
| 454,720 | 6/1891 | Dexter | 43/139 |
| 923,368 | 6/1909 | Myser | 43/139 |
| 1,071,620 | 8/1913 | Kingsland | 43/139 |
| 1,478,424 | 12/1923 | Cross | 43/139 |
| 1,517,131 | 11/1924 | Thompson | 43/139 |
| 1,797,557 | 3/1931 | Stine et al. | 15/344 UX |
| 2,992,770 | 7/1961 | Keiser | 43/139 UX |
| 3,024,343 | 3/1962 | Siwakoski | 228/20 |
| 3,231,997 | 2/1966 | Shugarman | 43/4 |
| 3,337,897 | 8/1967 | Lerner et al. | 15/341 |
| 3,711,987 | 1/1973 | Fisk | 43/134 |

*Primary Examiner*—F. Barry Shay
*Attorney, Agent, or Firm*—Leitner, Palan & Martin

[57] ABSTRACT

A manually operated, manually-powered, hand held suction device for capturing insects, solder, or other small objects by creating and then discharging a stored vacuum. A suction pulse is produced by initially creating a vacuum in an internal storage chamber of the suction device by using a manually operated piston pump, and subsequently creating an instantaneous suction into the muzzle or nozzle of the device and thence into the storage chamber by opening a trigger actuated shutter valve which lies in the barrel between the chamber and the atmosphere. The pump may include two check valves whereby repeated operation of the pump strengthens the stored vacuum. The object is sucked into the valve and toward the chamber where it is stopped by a screen. The object can then be ejected back through the muzzle by reversing the check valves or the direction of motion of the piston, pressurizing the chamber by means of the piston pump, and again pulling the trigger. The shutter valve is operated independently of the pump and can be manually triggered after the operation of the pump has been completed.

62 Claims, 5 Drawing Figures

MANUALLY OPERATED SUCTION DEVICE FOR CAPTURING SMALL OBJECTS

The present application is a continuation-in-part of my co-pending application entitled "Insect Suction Gun", filed July 10, 1972, Ser. No. 270,542, now abandoned.

BACKGROUND OF THE INVENTION

1. Field of the Invention

The present invention relates generally to a portable, hand held, manually operated, manually powered suction device for capturing small objects such as insects or solder, and more particularly, to a suction pistol or pencil which includes a manually operated pump for producing and storing a vacuum in a chamber of the device.

2. Description of the Prior Art

Many different types of devices have been invented for capturing insects. Since early times, man has been collecting insects for study or for extermination. Rather simple devices have involved nettings or other closures which may be placed over the insect. As time passed, more sophisticated devices were used, such as fly paper and suction devices using a spring-loaded piston. The type of device, and consequently its structure, has depended upon the interest of the user. The entomologist has been interested in capturing the insect alive and studying it. The normal home-user has been interested in catching and exterminating the insects.

In the field of household insect extermination, the use of a hand-held spray from bottles or aerosol cans is common. The use of these sprays can be harmful or dangerous to humans (especially children) and animals and they can stain furniture or other objects.

The popularity of aerosol sprays can be partially attributed to the impersonal act of killing the insect. Many people are more reticent towards using a physical extermination device, such as fly swatter, then they are towards using a relatively impersonal chemical method. An even more impersonal and humane way of disposing of insects would be the use of a suction gun wherein the insect would be sucked into a chamber to be ejected elsewhere, possibly outdoors. Killing of the insect is then optional. The suction gun can be used for capturing an insect for study as well as for disposing of it with or without killing. The latter, of course, would be preferable to the insect and is a goal of this invention.

The use of manually operated suction guns is old in the art. These guns have generally involved a piston pump, spring loaded and released by a trigger to create a suction into the gun or catching device. The major problem with these devices is the pulse shape and weakness of the suction pulse. Due to the mass and inertia of the spring and piston, the suction builds up gradually as the piston accelerates and ends suddenly as the piston reaches the end of its travel. It would be more efficient to begin immediately with maximum suction when the insect is at maximum range and at a most unpredictable velocity relative to the muzzle, and gradually decrease the suction as the insect nears and enters the device. Also, the overall strength of the suction pulse of such devices is limited by the volume displacement of one stroke of the piston. Motor driven devices have strong suction but are complex to construct and operate. Neither manually operated nor motor driven insect suction guns have been found to be accepted.

It is partly to this critical problem of the prior art that the present invention is directed. By initially building a strong vacuum in an integrating chamber as a result of repeated reciprocation of a piston, maintaining it until one is within close vicinity of the insect, and suddenly opening a shutter device to expose the evacuated chamber to the atmosphere, a large and instantaneous suction is created which draws the insect into the catch chamber.

Because only the mass and inertia of air is involved, the maximum suction is reached almost instantaneously and then decreases to zero as the chamber fills with air until its pressure becomes atmospheric. Because of the integrating technique, e.g., check valve means and repeated reciprocation of the piston to repeatedly draw air from a vacuum storage chamber, the vacuum is strong and the strength of the suction pulse is large in comparison to the size of the vacuum storage chamber and the piston pump. By repeated operation of the pump means, energy may thus be stored at high energy density (strong vacuum) in a chamber volume much larger than the volume of the pump means. The pumping action is thus added or integrated over a number of cycles of the pump.

Then by suddenly and completely discharging the stored vacuum instantaneously by means of a rapid acting, wide opening shutter valve (through which a captured object passes), the manually powered, hand held suction device can produce a large suction force in proportion to its size and weight and in proportion to the manual force required to operate the pump. Using the same integrating technique in reverse, the storage chamber can be pressurized with high pressure and then the insect suddenly ejected from the catch chamber and gun.

A number of manually operated, hand held suction type desoldering devices have been invented for removing molten solder from an electrical terminal after the terminal or connection is heated by means of a soldering iron to melt the solder. Such devices generally utilize a spring loaded piston and are used primarily for removing excess solder from an electrical connection or for desoldering an electrical connection in order to remove an electrical component. They also can be used for retrieving small work parts accidentally dropped into an electrical assembly, as well as solidified bits of solder, and are generally small and pencil or cigar shaped for ease of carrying and holding and for operation in confined work spaces.

The spring loaded piston devices utilize energy manually stored in the spring to accelerate the piston in a cylinder upon trigger release of a piston latching means. The piston motion produces a vacuum in the cylinder chamber and an adjoining nozzle at one end of the cylinder chamber as the piston accelerates away from the nozzle, and the resulting action draws the molten solder into the nozzle. The piston has a nipple which is integral with the piston and fits into the nozzle for mechanically ejecting from the nozzle the captured, now solidified, solder in case the pressure resulting from the return of the piston toward the nozzle is insufficient to eject the solder. Because of the inertia of the piston and spring, which limits their rate of acceleration for a given spring force, and because of their limited distance of travel in the cylinder before they must start decelerating, the suction or pressure builds up slowly and is never very strong, the energy stored in the spring being disssipated slowly over a relatively long period of time, as with the prior art insect suction guns. Because the nipple is within and therefore restricts flow through the nozzle during the early part of the suction pulse, a small differential pressure is created across the nozzle during the initial part of the suction stroke and is converted substantially instantaneously into suction when the nipple leaves the nozzle. This increases the suction force and capturing capability somewhat, but this increase is relatively small by virtue of leakage of air through the nozzle around the nipple, as well as by virtue of the small fraction of the suction stroke that the nipple acts as a flow restrictor. Another limitation of this technique is that the acceleration and deceleration of the piston and spring cause a recoil of the device which can be irritating to the operator and even dangerous to the operator or the apparatus, and can move the nozzle away from the electrical connection before the suction pulse is complete, thereby reducing the amount of molten solder that is captured. Another difficulty with the spring loaded piston devices is that solder sometimes passes through the nozzle into the variable volume cylinder chamber and may jam the piston as well as present added difficulty in its removal from the device. The captured solder is sometimes trapped and difficult to remove as a result of the necessarily larger cylinder diameter than the diameter of the nozzle.

Other manually operated manually powered, hand held suction type capturing devices have been invented but these appear generally to be less practical than the devices described above. Some of the devices utilize air flow induced by a moving piston or other operating pump means to eject a captured object, but the pressure developed in this way is very close to atmospheric and thus has limited capability for ejecting from the device a captured object which tends to stick to the walls of the device.

SUMMARY OF THE INVENTION

The present invention is a manually operated, manually powered, completely hand held suction device for capturing insects, molten solder from an electrical connection, or other small objects for observation, removal, relocation or extermination. One embodiment especially suitable for capturing insects, comprises a pistol-shaped housing with an internal chamber connected to the pistol muzzle and to a manual pump having two check valves. By manual reciprocation of the piston, the internal chamber is gradually evacuated and a partial vacuum of desired strength is formed therein. The barrel housing forms an aperture means connecting the chamber with the atmosphere. Within the barrel is a spring-loaded and trigger activated shutter valve which blocks the aperture means and, when manually activated, opens rapidly and exposes the evacuated chamber to the atmosphere. Thus, an instantaneous suction is created proximate to the muzzle of the suction gun in response to the substantially instantaneous and substantially complete unblocking of the aperture means. Being small, powerful and pistol-shaped, the device may be easily held in one hand and a fast moving insect may be relatively easily followed and captured.

The housing optionally includes an insect attracting device to lure an insect close to the muzzle communicating with the shutter device. This insect attracting device may, for example, be a simple pen-light bulb and battery, phosphorescent material or luminescent paint. The walls of the catch chamber may be transparent such that the presence of the insect or other object may be verified and its condition observed. The catch chamber can be the barrel portion between the shutter valve and a screen or net which blocks the insect and foreign material from entering the internal chamber, check valves or piston cylinder.

To force the insect out, the two check valves are rotated to their reverse position and the pump is used to pressurize, rather than depressurize, the internal chamber means. Upon activation of the triggered shutter, the insect is blown back out of the gun, through the barrel and muzzle through which it entered. This reverse action also allows the screen, barrel and shutter to be air cleaned. Water or other liquid may also be drawn into the gun and ejected for cleaning and other purposes.

For simplicity, the check valves may be eliminated if a single stroke of the piston provides sufficient depressurization or pressurization.

A second embodiment of the present invention is a manually powered, completely hand held, suction device which is especially suitable for capturing molten solder from an electrical terminal. The device has a trigger actuated valve between a variable volume pump chamber and a nozzle. The chamber is formed by a piston and a cylinder. Cocking the trigger mechanism holds the valve closed to facilitate depressurization of the chamber as the piston is manually drawn rearward away from the valve and nozzle and latched in the rearward position. The trigger is then actuated manually to suddenly open the valve and suck an object proximate to the nozzle into the nozzle as a result of the sudden inrush of air from the atmosphere into the nozzle, through the valve and into the depressurized cylinder. The object is stopped by a screen prior to reaching the valve. The valve is closed again by cocking the trigger once more, and this allows pressurizing the cylinder by pushing the piston forward toward the valve and nozzle and latching the piston in the forward position. Subsequent manual activation of the trigger releases the pressure into the nozzle and ejects the captured object from the device and nozzle. The cycle may then be repeated for capturing and ejecting another object. For removing solder, the soldered connection is heated to melt the solder, the tip of the nozzle is placed at or against the connection after depressurization, and the valve is activated by means of the trigger to suck most of the molten solder into the nozzle, where it quickly solidifies upon contact with the nozzle and screen and by virtue of cooling by the air being sucked into the device.

The inertia and distance of travel of the valve are much less than those of a spring loaded piston. Also, the trigger actuation of the valve includes a hammer to speed the opening of the valve. For these reasons, the energy stored by the pump is converted into a pneumatic pulse which, relative to the spring loaded devices, is substantially instantaneous, assuming the valve ports and nozzle have adequate bores. Also since, in contrast with the spring loaded piston devices, the valve may be operated independently of the pump, full vacuum or pressure storage may be obtained before equalizing the pressure in the storage chamber with the atmospheric pressure at the nozzle, i.e., before converting the stored pneumatic energy into a pneumatic pulse. Since the pneumatic energy is stored slowly but fully at low power and then converted substantially instantaneously and substantially completely into a pneumatic pulse at high power, the device produces a very strong suction or pressure pulse in proportion to its size, weight and required pumping energy. Also, a maximum suction force is obtained near the beginning of the suction pulse, while the differential pressure available for suction is near maximum. This is desirable for capturing an object since its distance from the nozzle is greatest at the beginning of the pulse and requires the greatest suction to start it moving toward the nozzle.

The substantially lower inertia and distance of travel of the valve relative to the spring loaded piston also reduces the recoil of the device. There is no recoil caused by the piston pump of the present invention because pumping has ceased before activation of the trigger and valve, in contrast with the prior art devices. Thus, the trigger valve of the present invention may be activated independently of the pump means, in contrast with the spring loaded devices, and the valve and trigger are the only parts moving during the suction (or pressure) pulse. This facilitates minimal recoil of the device. Further, the constant diameter nozzle and screen in combination with the strong pressure pulse available facilitate ejection of a captured object from the device. The device may be small and pencil-shaped and can be held by the thumb and first two fingers. The index finger can be easily be used to pull the trigger, while holding the device by the thumb and second finger.

A large area, cup shaped screen or filter is provided in the nozzle to filter out particles which could jam or degrade the sealing of the valve or piston cylinder. The cup shaped screen provides a large filter area to reduce pressure differential across the screen, while forming a portion of the uniform bore nozzle. Thus, the screen does not reduce the volume or capacity of the nozzle to hold captured objects, nor does it mechanically restrict their ejection after capture. The screen, as well as the remainder of the nozzle, may be Teflon or Teflon coated to reduce adhesion between these surfaces and captured objects to further facilitate ejection. The screen can be easily cleaned in situ by means such as a small diameter brush or, alternatively, can easily be removed for cleaning.

The small valve piston in the valve body can be manually reciprocated or twirled by means of its protruding stem, in order to dislodge any foreign matter which may somehow enter the valve. The valve is also easily dismantled for cleaning or servicing.

OBJECTS OF THE INVENTION

Accordingly, it is an object of the present invention to provide an improved, portable, manually operated, manually powered, hand held suction device for capturing small objects for removal, observation, relocation or disposal.

Another object is to provide an improved device for following and catching an insect.

A further object is to provide an improved portable desoldering device.

An additional object is to provide an improved portable, small, powerful, object capturing device which may be held and operated in one hand.

Another object is to provide a small, efficient, portable, object capturing decive which is harmless to the operator and his belongings.

A further object of the invention is to provide an improved hand held and operated object capturing device utilizing a manually operated pump for producing and storing a strong vacuum in a chamber of the device.

Another object of the invention is to provide a hand held object capturing device having a pump for storing a vacuum and means for converting the stored vacuum into an efficient suction pulse wherein the maximum suction force occurs near the beginning of the pulse.

An additional object is to provide a hand held object capturing device having minimum recoil.

Still another object is to provide an improved hand held, manually operated, suction type object capturing device which utilizes vacuum storage and substantially instantaneous release of the stored vacuum for capturing small objects, and ejects captured objects when and where desired by pressure storage and substantially instantaneous release of the stored pressure.

A further object is to provide a hand held, manually operated suction type object capturing device utilizing a pump for vacuum storage and a rapid opening valve operated independently of the pump for converting the previously stored vacuum into a substantially instantaneous suction pulse.

An additional object is to provide a suction pistol utilizing a repeatedly operated pump means for producing a strong vacuum within the pistol, for subsequent conversion by independently operated shutter valve means into a strong suction pulse at the muzzle of the pistol.

A still further object is to provide a hand held object capturing device having a pump utilizing rotatable check valves such that the pump may selectively produce a partial vacuum within a chamber of the device for capturing a small object or an over-pressure in the chamber for ejecting the object when and where desired.

An additional object is to provide a small, hand held and operated object capturing device utilizing a pump and an independently operated valve for storing and subsequently substantially instantaneously discharging a vacuum, and having a large area screen means for substantially preventing entry of foreign matter into the valve and pump without severely restricting either the substantially instantaneous discharge or the subsequent ejection or removal of a captured object.

Still another object of the invention is to provide a small, hand held and operated, pulsatile suction device for capturing small objects utilizing a simple, compact, practical, trigger operated valve for substantially instantaneously discharging a previously stored vacuum or pressure.

DESCRIPTION OF THE PREFERRED EMBODIMENTS

Figure 1:
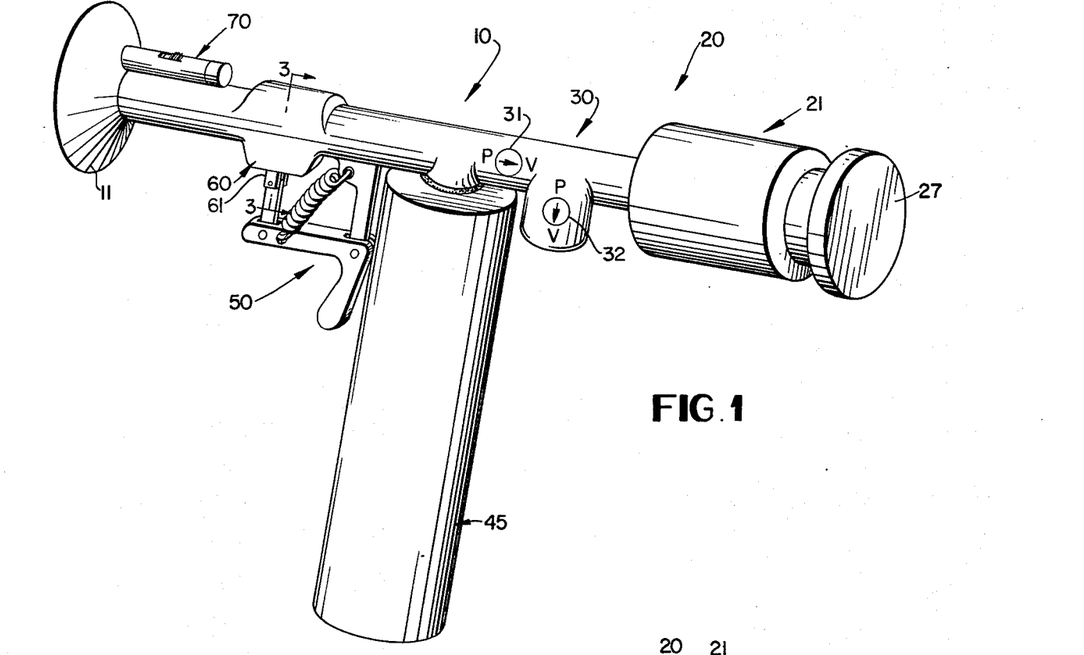
FIG. 1 is a perspective view of an embodiment of the present invention especially suitable for insect catching wherein the capturing device is pistol shaped and has a piston cylinder, two check valves, internal chamber means for vacuum or pressure storage and an aperture means formed by the barrel and blocked by a trigger actuated shutter valve.

FIG. 1 depicts a substantially pistol shaped embodiment of the present invention especially suitable for use as an insect suction gun. A barrel housing, indicated as 10, has a funnel shaped opening or muzzle 11. At the rear of the housing is a pneumatic suction of pressurizing pump, generally denoted as 20. This pump has a piston-cylinder subassembly 30 containing check valves 31 and 32. A cannister or pressure vacuum chamber 45, which functions also as the handle of the pistol shaped object capturing device, is removably secured to the housing 10. Internal chamber 45 is the primary storage chamber of an internal chamber means which is connected to the atmosphere at muzzle 11 via an aperture means formed by the barrel 10. A shutter valve shown generally as 60 near the front of the barrel blocks the aperture means to allow depressurization or pressurization of the internal chamber means by pump 20. Upon manually evacuating the internal chamber 45 using the pump 20, a partial vacuum is produced in chamber 45 and the barrel portions between check valve 31 and shutter valve 60. The suction pistol is then held in one hand and the muzzle placed in front of an insect, molten solder or other object to be captured. Also secured to the barrel housing is a triigger mechanism 50 for rapidly opening valve 60 after pressurization or depressurization to substantially instantaneously and substantially completely unblock the aperture means to substantially instantaneously and substantially completely equalize the pressure in the internal chamber means with the atmospheric pressure at the muzzle, thereby completely converting the stored vacuum or pressure in the internal chamber means into a strong, substantially instantaneous suction or pressure pulse proximate to the aperture means for capturing or ejecting a small object such as an insect or solder. Upon activation of trigger 50 and shutter valve 60, air proximate to the muzzle 11 rushes in to the evacuated chambers and sucks the object with it. The suction or pressure pulse is very strong since pneumatic energy stored gradually at low power by repeatedly operating the pump means is dissipated substantially instantaneously at high power. A device to attract an insect to the flexible, funnel-shaped opening or muzzle 11 is shown as a pen light device 70 mounted to the barrel at the muzzle.

As shown in FIG. 1 and to be discussed more fully later, check valves 31 and 32 have direction of flow indicators which point to a P or V which represent pressure and vacuum, respectively.

Figures 2, 3:
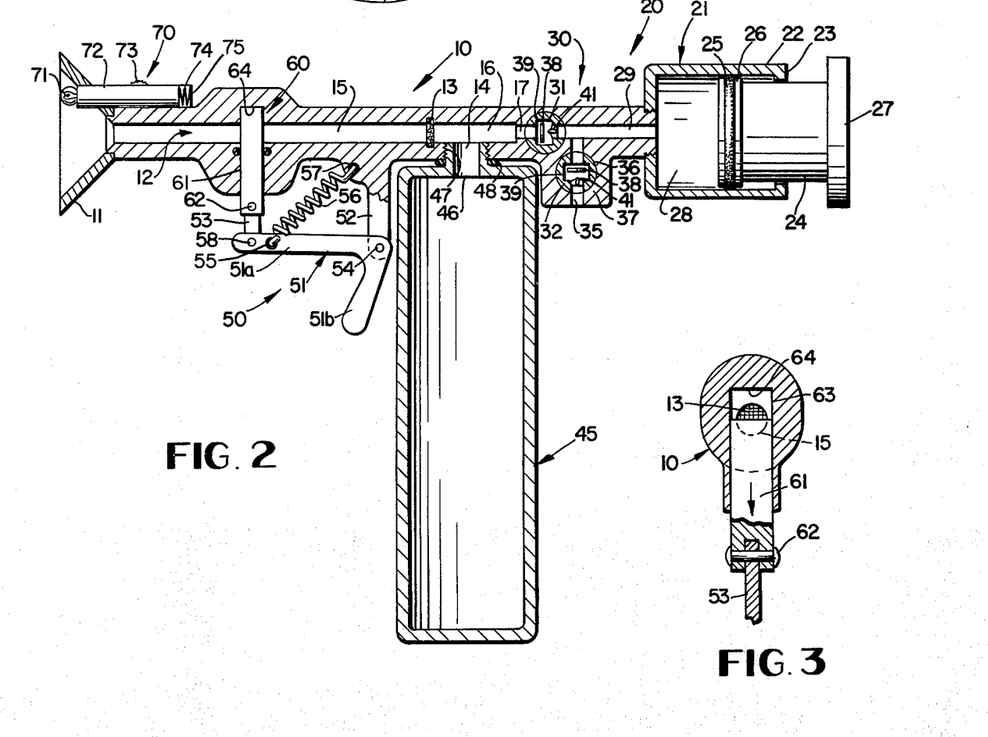
FIG. 2 is a cross-sectional view of the embodiment of FIG. 1.
FIG. 3 is a cross-sectional view of the shutter valve mechanism taken along line 3—3 of FIG. 1.

Turning to a cross-sectional view as shown in FIG. 2, the barrel 10 has funnel shaped opening or muzzle 11 at the front of the pistol which communicates via an internal duct or barrel portion 12 with shutter valve 60 in the barrel 10 between barrel portion 12 and barrel portion or catch chamber 15 just to the rear of duct 12 and valve 60. At the rear of catch chamber 15 is a barrier or collection screen or net 13 which stops the object and/or foreign particles being captured. Thus, the barrel portion between shutter valve 60 and screen 13 defines a catch chamber 15. Barrel portion 16 extends rearwardly from screen 13 to duct 17 of pump means 20. Communicating with barrel portion 16 at a point behind the screen 13 is a perpendicular duct 14 which communicates with the vacuum or pressure storage chamber 45. At a point just behind duct 14 is the pump assembly 20 which communicates by means of duct 17 with the rear end of the barrel, i.e. the rear end of duct 16, just behind the entry point of duct 14 into barrel portion 16. Screen 13 may alternatively be located at a point in barrel portion 16 just to the rear of duct 14. With this modification, the object may be collected in chamber 45. To remove the captured object, the bottom of now collection chamber 45 may be removable. On the other hand, if the device were used for desoldering purposes, it is likely that screen 13 would be located in front of valve 60 to preclude entry of the solder into the valve.

The pump 20 has a piston-cylinder assembly 21 and a check valve assembly 30. The piston cylinder assembly 21 comprises a cylinder 22, a piston stop 23 at the rear of the cylinder 22, a piston 24 having an O-ring seal 25, O-ring groove 26 and handle 27. The pump chamber defined by the front end face of piston 24 and the portion of cylinder housing 22 to the front of the piston face is designated 28. This pump chamber communicates via duct 29 to the check valve subassembly 30 and check valves 31 and 32. Duct 35 connects the duct 29 with the outside atmosphere through check valve 32, while duct 17 connects duct 29 with barrel portion 16 and duct 14 through check valve 31. Although pump 20 has been shown as a piston cylinder device, it could be any manually operated pump device, such as a bellows or rubber bulb, for example.

Check valves 31 and 32 each have a body having a cylindrical outer surface 36 for rotation and sealing within housing 37 of check valve assembly 30. Wafer 38 blocks flow in one direction by moving against seat 39, while allowing flow in the other direction by moving against tab 41 which prevents sealing of wafer 38. To operate the system in a vacuum mode, shutter valve subassembly 60 is normally closed and check valves 31 and 32 are selectively positioned as indicated in FIG. 1 (pointing to the V). As piston 24 is drawn backwards in housing 22, air is drawn out of internal chamber 45 through ducts 14, 16 and 17, through check valve 31 and duct 29, into the enlarging pump chamber 28. Upon the forward stroke, the air in chamber 28 is forced through ducts 29 and 35, and check valve 32 in duct 35, to the atmosphere. Continuous operation of piston 24 will eventually almost completely evacuate the internal chamber means or pressure vacuum storage system and produce a strong partial vacuum therein. Duct 14, the portions of barrel 10 behind shutter valve 60, and duct 17 each function as an internal chamber and along with chamber 45 comprise the internal chamber means of the capturing device for purposes of vacuum or pressure storage. Obviously, any one of these chambers, if made large enough, could substantially constitute the entire internal chamber means. For purposes of vacuum storage, pump chamber 28 could be considered as an internal vacuum storage chamber if piston 24 were drawn to the rear of cylinder 22 and latched, by means not shown, in this rearward position before actuation of trigger 50 and valve 60, whereby the internal chamber means of the device would be augmented by virtue of pump chamber 28. This added use of chamber 28 would contribute to a stronger suction pulse.

To operate the system in the pressure mode or to remove an object from catch chamber 15 just in front of screen 13, the check valves 31 and 32 are rotated 180° with both of the indicia arrows pointing toward the P. With the check valves in this position, and with piston 24 being drawn rearward in housing 22, air is brought in from the atmosphere through check valve 32 to fill pump chamber 28. Upon the forward stroke of piston 24, the air accumulated in chamber 28 is forced through check valve 31 and into cylinder 45 through ducts 29, 17, 16 and 14. Repeated reciprocation of piston 24 gradually increases the over-pressure, or pressure above atmospheric, in chamber 45 and the remainder of the internal chamber means, i.e., pressurizes the internal chamber means. Thus, by virtue of the manually adjustable check valves, the device may be selectively operated in either the pressure or the vacuum mode.

The pressurization may kill a captured insect. If this is not desired, valve 60 may be held open by means of trigger 50 while pushing piston 24 forward in the pressurization mode, whereupon the insect is ejected at a relatively low pressurization resulting from a single piston stroke. Such ejection at relatively low positive pressure is possible since it is generally easier to eject a captured object than to capture it. Bore portions 12 and 15 are shaped to form a nozzle having a substantially uniform and smooth bore, whereby the ejection of a captured object is facilitated.

At the top of chamber 45 is an aperture 46 which allows the chamber to communicate with duct 14 and consequently barrel portions 16 and 15 of barrel 10 and with pump 20. The removable connection 47 between the chamber 45 and the barrel housing 10 allows chamber 45 to be removed for cleaning. O-ring seal 48 is provided to avoid leakage to or from the atmosphere.

The trigger assembly 50 is shown as a generally L-shaped member 51 having level arm 51a and handle 51b hingedly secured to an arm portion 52 of the barrel housing 10 by pin 54 and to the shutter valve subassembly 60 through linkage 53. Trigger 51 is held is a cocked position (shutter valve closed) by spring 56 which is secured at one end through aperture 55 in lever arm 51a, and at the other end through hole 57 in barrel housing 10. Linkage 53 is secured to the trigger 51 by pin 58 and to the shutter 61 by pin 62. On rearward movement of trigger 51, linkage 53 moves shutter 61 down against the tension of spring 56, thereby opening shutter valve 60. Upon release of the trigger, spring 56 pulls trigger 51 into its normal forward position and reinserts shutter 61 secured and tight within barrel housing 10, whereby valve 60 is closed and flow in barrel 10 is blocked.

Because pin 58 has a greater lever arm, or distance to fulcrum pin 54, than does the probable line of action of an operator's index finger on handle 51b, shutter 61 moves at a higher speed than the operator's finger, to facilitate rapid opening of shutter valve 60 and minimal elongation and diminution by valve 60 of the suction or pressure pulse.

Because shutter 61 extends a short distance above barrel portions 12 or 15, it has accelerated to a finite velocity at the time shortly after the trigger is pulled when it actually begins opening barrel 10 and valve 60, whereby the opening time of valve 60, and thus the elongation and diminution of the suction pulse, are further reduced by virtue of this distance.

Figure 4:
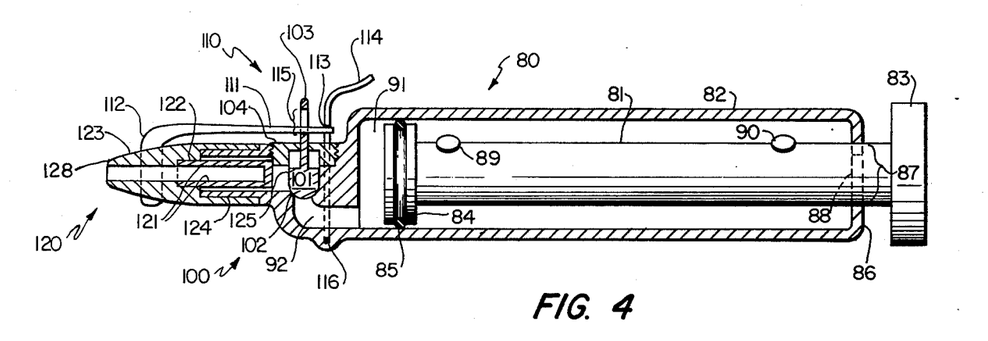
FIG. 4 is a substantially cross-sectional view of a pencil shaped embodiment of the present invention especially suitable for use as a desoldering implement.

Other means for facilitating rapid opening of shutter valve 60 can be provided. As one example, a hammer could be manually cocked and then released by pulling a trigger, whereupon the hammer would strike a valve linkage to suddenly open the valve (such as illustrated in FIG. 4). Such a valve may open faster than valve 60 but may be more susceptible than is valve 60 to jamming and leakage as a result of foreign matter entering the valve, unless a screen is used in front of the valve — which is desirable for a desoldering device but not so desirable for an insect catcher. Another example of a shutter valve mechanism would be any snap-action device which would cause instantaneous mechanical movement from one stable position to a second position.

In FIG. 3, the relationship between the shutter subassembly 60 and the housing 10 is shown. Cylindrical shutter 61 rides within matching slot 63 of housing 10. The diameter of shutter 61 and slot 63 is greater than the diameter of duct 12 (and 15) to provide a sealing area between shutter 61 and slot 63. The distance between the upper end or tip of shutter 61 or slot 63 and the highest portion of duct 12 or 15 is illustrated. Once chamber 45 has been evacuated, creating a vacuum therein, the opening of the shutter valve 60 by pulling trigger 51 causes a substantially instantaneous and complete unblocking of the aperture means of the capturing device, which results in an instantaneous suction of air from the atmosphere through funnel 11 to substantially instantaneously equalize the pressure of the evacuated chamber 45 and the atmosphere. Any object, such as an insect, that is within maximum range is sucked into the barrel or aperture means and stopped by screen 13.

To remove a captured insect or other object from barrel 10, the pump 20 is operated in the pressure mode. With check valves 30 and 31 reversed, the manual pumping of piston 24 creates an over-pressure or pressure above atmospheric, in chambers 45, 14, 15, 16, and 17. If trigger mechanism 50 is activated to open shutter assembly 60, the pressurized air rushes out of barrel 10 via muzzle 11, to the atmosphere, carrying with it the captured object. It should be noted that by using the pump in the pressure mode, any debris in or in front of screen 13 generally is also thereby ejected.

As shown in FIGS. 1 and 2, the light attracting device shown in this embodiment is a light source 70. A light bulb 71 is electrically connected to battery 72 which is held in place by spring 74 and removable cap 75. Switch 73 can be used to disconnect the bulb from the battery when light is not required to illuminate luminescent paint or other light scattering material on the front surface of funnel 11. An alternate means of attracting insects to the funnel opening 11 is the use of a phosphorescent material on funnel or muzzle 11.

A pencil shaped embodiment of a hand held and operated object capturing device which is especially suitable for desoldering electrical connections is illustrated in FIG. 4. The suction pencil includes a manually operated piston pump 80 for depressurizing or pressurizing the internal chamber means in front of the piston, a shutter-type valve 100 which is forward of the pump and the internal chamber means and which is opened rapidly by means of trigger assembly 110 to substantially instantaneously and completely convert the stored vacuum or pressure in the internal chamber means into a strong substantially instantaneous suction or pressure pulse at nozzle 120 forward of the valve and at the front of the pencil.

Pump 80 comprises piston 81 riding in cylinder 82 and manually operated by means of handle 83. Piston 81 is in sealing arrangement with cylinder 82 by virtue of a large diameter front piston portion 84 on which is mounted a flexible piston ring 85, such as an O-ring, which makes contact with the inside surface of the cylinder side wall. The remainder of the piston has a smaller diameter to slidably fit through an opening 87 in cylinder end plate 86 at the back end of cylinder 82, which end plate provides support for the piston. A portion 88 of the opening 87 in the back end plate of the cylinder is widened to allow button shaped raised portions 89 and 90 on the side wall of piston 81 to pass through the opening 87 and back end plate 86 of the cylinder as the piston is pushed forward or backward in the cylinder. The piston may be reciprocated backward or forward in the cylinder to depressurize or pressurize the internal chamber means consisting substantially entirely of pump chamber 91. Pump chamber 91 is defined by the front face of piston 81 and the portion of cylinder 82 forward of the piston face. In addition to variable volume pump chamber 91, the internal chamber means for vacuum or pressure storage includes duct 92 which leads forward from the front end of pump chamber 91 into valve 90. Buttons 89 and 90 are used in conjunction with cylinder back end plate 86 to latch the piston in the backward or forward position after depressurization or pressurization of the internal chamber means. This is accomplished by first rotating piston handle 83 so that the buttons pass through end plate 86 as the piston is manually reciprocated, and then rotating handle 83 so that the desired button engages an unwidened portion of the back end plate. Button 89, which is forward of button 90 on piston 81, is used for latching the piston after vacuum storage, i.e., after depressurization, whereas button 90 is used to latch or maintain the piston position after pressure storage or pressurization.

After vacuum or pressure storage and latching of the pump piston 81, valve 100 may be opened rapidly when desired by actuating trigger means 110, thereby producing the desired suction or pressure pulse. Valve 100 comprises a small valve piston 101 which is movable upward and downward in the valve body and seats against a conical valve seat 102 formed in the valve body below the valve piston. To provide a good seal and thus prevent substantial leakage of the stored vacuum or pressure from the internal chamber means, either the valve seat or the bottom surface of the valve piston may contain a soft gasket, not shown. Part or all of the valve can be made of anti-stick Teflon. The valve piston 101 has a stem 103 extending upward and out of the valve body through a central opening in threaded plug 104 which forms an upper valve body portion which may easily be unscrewed from the lower valve body portion to allow removal of valve piston 101 and cleaning or servicing of the valve.

The valve 100 may be closed and rapidly opened by trigger assembly 110, which latter includes flexible hammer 111 which is mounted at its base 112 to nozzle 120 and is held down at its tip by a shoulder 113 of flexible trigger arm 114. The spring hammer 111 in turn holds down the valve piston 101 against its seat by pressing down against the lower end of slot 115 in the upper portion of valve stem 103. Thus, as illustrated in FIG. 4, the spring hammer is cocked and the valve is held closed. To rapidly open the shutter type valve 100, spring trigger 114 may be pressed downward and backward toward cylinder 82 by the index finger while supporting the suction pencil between the thumb and second finger. This finger pressure causes trigger arm 114 to flex and rotate backwards or clockwise about its point of support or square mounting hole 116 in the pencil housing below valve 100, thereby moving shoulder 113 past the end or tip of hammer 111 and releasing the flexible hammer. Upon release, the spring hammer 111 springs upward rapidly and hits the upper end of slot 115 in the valve piston stem, and carries the valve piston upward until the wide lower portion of the valve piston moved sufficiently upward to engage the threaded plug 104 and be stopped by it. Some damping can be obtained here if desired to cushion the collision of the valve piston with plug 104, by virtue of the air trapped between the wide portion of the valve piston and the threaded plug. By virtue of the upward moving hammer thus striking the valve stem, shutter valve 100 is substantially instantaneously and completely opened, thereby substantially instantaneously and completely equalizing the pressure in the internal storage chamber means with the atmospheric pressure at the nozzle 120 by substantially instantaneously and completely unblocking the aperture means formed by the valve body and nozzle, the aperture means being the means by which the internal chamber means is connected to or communicates with the atmosphere.

After the stored vacuum or pressure is thus discharged, and a small object is captured or ejected, the valve must be closed, i.e., the aperture means must be blocked to allow pressure or vacuum storage in order to eject the captured object or to capture a new object. This can be done by pushing the spring hammer 111 downward with a finger until it passes the shoulder 113 of the spring trigger arm 114, whereupon the flexible trigger arm 114 springs a short distance forward to catch or engage the tip of hammer 111, thereby latching the spring hammer in its downwardmost position. In this way, the hammer is cocked and, in addition, since the downward moving hammer engaged the lower end of slot 115 of valve piston stem 103 and forced the valve piston downward onto its seat below it, the valve 100 is automatically closed by the cocking of the hammer of the trigger assembly. This readies the suction pencil for manual operation of the piston pump to store a vacuum or pressure. Thus, valve 100 is basically a check valve which is closed and rapidly and fully opened by a mechanical positive acting trigger mechanism so that it operates as a shutter valve with respect to the rapid and wide opening of the valve.

Positioned within and forming a cup shaped portion of nozzle 120 near the rear of the nozzle and just in front of valve 100 is a cup shaped filter or fine screen 121 which protects the valve and pump against entry of foreign particles above a given size range which could degrade their performance. The open end of the screen cup 121 faces forward and its inside diameter substantially matches that of the front portion of the nozzle, whereby the nozzle has a substantially constant or uniform diameter or bore or cross-section, to avoid any mechanical restriction of the ejection from the nozzle of solidified solder or other captured object. The cup shaped screen 121 forms a substantial portion of the nozzle bore and thus has a much larger filter area and much smaller fluid drag than would a simple disc shaped filter or screen having the same diameter as the nozzle bore. In fact, screen 121 would extend substantially the entire length of the nozzle. Thus the cup shaped screen 121 could be lengthened so that the opening or mouth of the cup substantially coincides with the forward tip of nozzle 123, i.e., substantially coincides with the muzzle 128 of the nozzle.

The filter or screen 121 is supported by a recess 122 in the front portion 123 of the nozzle, and the front nozzle portion in turn slips over and is supported by a forward extension 124 of the body of valve 100. Thus, nozzle portion 123 can be slipped forward and away from valve body extension 124 for removal of screen 121 for cleaning or replacement, or for cleaning the nozzle or valve. Valve body extension 124 has a slightly larger inside diameter than the outside diameter of the cup shaped screen 121, whereby air may easily flow in the annular space between these two while flowing from the screen to the valve or from the valve to the screen. Air also flows through the closed end of the screen to and from the valve. Extension or duct 124 communicates with the valve cylinder in which the valve piston rides by means of port 125 in the side wall of the valve cylinder just above the valve seat 102. The rear of screen 121 abuts against threaded valve plug 104, while the front of the cupped screen abuts against the forward end of the nozzle recess 122. Of course, threads may be provided to join front nozzle portion 123 to extension 124. If this is done, hammer 111 could be slipped forward and off of nozzle portion 123 and thus free of the remaining valve members prior to unscrewing the nozzle portion from extension 124. Or a threaded collar may be used in order to avoid having to rotate nozzle portion 123 relative to extension 124.

Figure 5:
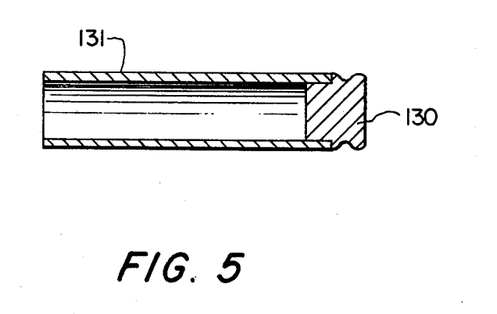
FIG. 5 is a cross-sectional view of an alternate screen or filter assembly for the suction pencil of FIG. 4.

For easier cleaning, the closed end of the screen 121 may comprise a small, short removable sealing plug 130 fitted into the cylindrical wall of the alternative screen 131 at the rear of the screen as shown in FIG. 5. After disassembly of the nozzle, the plug 130 can then be removed from the end of the cylindrical screen for cleaning or replacing the screen.

The structure of the embodiment of FIGS. 1–3 provides a small, compact, practical, hand held and operated, object capturing device which can be used by entomologists to capture bugs, insects or other lower life forms and by the ordinary home-user to capture insects and dispose of them outdoors or elsewhere without killing them unless desired, and without harming himself or the environment. The technique of integrating the vacuum or pressure effects of a number of piston cycles to build up a strong vacuum or pressure in a storage tank which can be much larger than the piston pump provides greater capacity and capture range than do earlier manually operated devices. In all of the illustrated embodiments, the rapid discharge of the stored vacuum (or pressure) without being significantly limited by the mass and acceleration of a mechanical part provides more efficient use of a produced vacuum than in earlier devices in that maximum suction is reached early in the pulse when the insect is at a greatest range and at a most unpredictable velocity relative to the muzzle. By choice of port size, the discharge time of the vacuum or pressure can be selected and optimized and can be made shorter than the discharge time of a suction device requiring acceleration of a major mechanical part initially at rest. The combination of vacuum storage and an instantaneously opening discharge valve, even without the integration technique, substantially reduces the recoil and required size of the device. In addition, the present invention provides a relatively easy means for ejecting a captured object when and where desired. For these and other reasons, the present invention is advantageous for use as an insect catcher, a desoldering device or for capturing still other small objects. The term "object" as used herein thus may include an insect or other small life form, a solid or a fluid, e.g., molten solder.

It should be understood that piston cylinder assembly 21 of FIGS. 1 and 2 and pump 80 of FIG. 4 can be replaced by another manual pumping means such as a rubber bulb or bellows. In the embodiment of FIGS. 1 and 2, the pump means could be provided by making the walls of chamber 45 flexible or replacing it by a rubber bulb or bellows or other flexible pump mechanism which could serve simultaneously as pump means, internal chamber, and handle of the suction pistol. It could then replace pump 20 whereby pump 20 could be removed and duct 17 plugged and sealed. Thus, the pistol handle can be a flexible, variable volume, squeezable chamber. Without check valves, it would operate essentially the same as pump 80 of FIG. 4, except perhaps for the latching means which could, for example, be provided to an extend by hand pressure. With check valves, it could operate essentially the same as pump 20. For example, pump 20 and chamber 45 could be interchanged with each other so that pump 20 forms the pistol handle and chamber 45 becomes a barrel portion. If then, piston cylinder assembly 21 were replaced by a flexible pumping chamber such as a rubber ball or bellows, the same hand could be used for holding the suction pistol, operating the trigger and operating the pump as well.

Either with or without check valves, flexing of the pistol handle by the hand is holding the pistol and operating the trigger can provide the primary or sole energy for operating the pump means and the flexible handle can serve as the primary or sole pump means. It also follows that the pump means may include or consist of a flexible chamber and the flexible chamber may serve also as a chamber or the primary chamber or substantially the sole chamber of the internal chamber means. It is also evident from the Figures and description that the internal chamber means may include a chamber of the pump means or may consist primarily or substantially entirely of a chamber of the pump means.

The two capturing device embodiments illustrated in FIGS. 1–4 do not have a screen to prevent entry of foreign matter into the rear of the device and, if this is desired, the piston pump at the rear of each of the two embodiments could be equipped with a bellows sealed or mounted to, and connecting, the cylinder and piston handle of the pump.

To provide faster air flow in the suction device of FIGS. 1–3, screen or filter 13 can be substantially or completely cylindrical and form a substantial bore portion of the barrel or aperture means such as illustrated in the embodiment of FIGS. 4 and 5 or otherwise be formed so as to provide a much larger screen area than the characteristic cross-sectional area of the aperture without forming a constriction in the aperture which could interfere with the ejection of a captured object.

Although the invention has been described and illustrated in detail, it is to be clearly understood that the same is by way of illustration and example only. It is not to be taken by way of limitation, the spirit and scope of this invention being limited only by the terms of the appended claims.

What is claimed is:

1. A manually operated, manually powered portable device for capturing small objects in the form of a hand held unit, said unit comprising:
a housing including an internal chamber means for vacuum storage;
aperture means in said housing for connecting said internal chamber means with the atmosphere;
pump means being a portion of said unit and communicating with said internal chamber means for depressurizing said internal chamber means relative to the pressure external to said aperture means to create a partial vacuum in said internal chamber means;
first valve means in said aperture means for blocking said aperture means during said depressurization and for substantially instantaneously substantially equalizing the pressure in said internal chamber means with said external pressure by substantially instantaneously substantially completely unblocking said aperture means when manually activated;
and means for activating said first valve means independently of the operation of said pump means.

2. A capturing device as in claim 1 wherein said first valve means comprises a shutter valve having a shutter for blocking said aperture means, and wherein said activating means comprises trigger means mounted to said housing for moving said shutter suddenly and rapidly so as to accomplish said unblocking.

3. A capturing device as in claim 2 further including spring means linked to said shutter valve for reblocking said aperture means after activation of said trigger means, thereby preventing loss of a captured object from the device.

4. A capturing device as in claim 2 wherein said trigger means includes a lever arm and a handle pivotally mounted to said housing, said lever arm being of substantially greater length than said handle, for providing a substantially greater speed of the shutter valve than the speed of the trigger finger of an operator.

5. A capturing device as in claim 2 wherein said first valve means includes means for maintaining the aperture means in a block condition immediately after trigger means activation until the shutter has accelerated to a finite speed.

6. A capturing device as in claim 2 wherein said trigger means includes a combination spring hammer which engages a valve stem of said shutter valve for accomplishing said blocking.

7. A capturing device as in claim 6 wherein said trigger means further includes a combination spring trigger for releasing said spring hammer in response to finger pressure on said spring trigger.

8. A capturing device as in claim 2 wherein said trigger means consists substantially entirely of a first member serving as a spring hammer and a second member serving as a spring trigger.

9. A capturing device as in claim 2 wherein said shutter valve has a valve stem shaped for engagement by said trigger means.

10. A capturing device as in claim 2 wherein said shutter valve has a slotted valve stem for closing and rapid opening of said valve in response to engagement of said stem by said trigger means.

11. A capturing device as in claim 2 wherein said valve and said trigger means include means for moving said shutter so as to re-block said aperture means upon cocking of said trigger means.

12. A capturing device as in claim 1 wherein said aperture means is shaped to form a nozzle and wherein said nozzle includes a screen means forming a substantial portion of the nozzle bore.

13. A capturing device as in claim 1 wherein said aperture means is shaped to form a nozzle and wherein said nozzle includes an internal screen means extending over most of the length of the nozzle.

14. A capturing device as in claim 1 wherein said aperture means is shaped to form a nozzle having a substantially uniform bore and further including screen means restricting captured objects to said substantially uniform bore.

15. A capturing device as in claim 1 wherein said aperture means includes a substantially cylindrical shaped screen which functions as a catch chamber for said objects.

16. A capturing device as in claim 1 wherein said housing includes a captured object blocking means for limiting the degree of penetration into said device of an insect or object sucked into said device through said first valve means.

17. A capturing device as in claim 1 wherein said pump means includes a piston and cylinder for depressurizing said internal chamber means by reciprocation of the piston.

18. A capturing device as in claim 1 wherein said pump means includes a second valve means communicating with said internal chamber means and with the atmosphere for selecting an evacuation mode or a pressurization mode of operation of said pump means.

19. A capturing device as in claim 18 wherein said second valve means comprises a first adjustable check valve communicating with said internal chamber means, and a second adjustable check valve communicating with the atmosphere, each of said check valves assuming a first position for said evacuation mode and a second position for said pressurization mode.

20. A capturing device as in claim 19 wherein said check valves are rotatably mounted in said housing and said first and second positions of said check valves are substantially 180° apart.

21. A capturing device as in claim 1 wherein said housing is substantially pistol-shaped, having an handle, a barrel and a muzzle, for both grasping said device with one hand and orienting said device with said hand with respect to an insect or object to be captured or with respect to a proposed destination of an object to be ejected, and wherein said activation means includes a trigger means mounted to said housing and manually operated for suddenly activating said first valve means when desired after operation of said pump means has been completed and after achievement of said orientation.

22. A capturing device as in claim 21 wherein said barrel includes a screen means behind said first valve means for blocking passage of a captured object sucked into said barrel through said muzzle and said first valve means.

23. A capturing device as in claim 22 wherein the barrel portion from said muzzle to said screen means has a substantially uniform cross-section, whereby capture and ejection of said object is facilitated.

24. A capturing device as in claim 21 wherein said internal chamber means includes a chamber in said handle for increasing the storage capacity of said internal chamber means.

25. A capturing device as in claim 1 wherein said internal chamber means includes a chamber of said pump means.

26. A capturing device as in claim 1 wherein said internal chamber means primarily consists of a chamber of said pump means.

27. A capturing device as in claim 1 further including means for repeatedly operating said pump means, whereby said partial vacuum in said internal chamber means is made stronger by said repeated operation.

28. A capturing device as in claim 1 wherein said pump means includes check valve means and a manually operated reciprocating member for displacing air or gas in a prescribed direction through said check valve means whereby repeated reciprocation of the member creates a strong vacuum in said internal chamber means.

29. A capturing device as in claim 28 further including means for manually changing the prescribed direction of air or gas flow through the check valve means such that repeated reciprocation of the member creates a high pressure in the internal chamber means.

30. A capturing device as in claim 1 wherein said pump means further includes means for pressurizing said internal chamber means relative to the pressure external to said aperture means, whereby a captured object or foreign matter may be pneumatically ejected from said device upon manual activation of said first valve means.

31. A capturing device as in claim 30 further including latching means for maintaining said pump means in the proper positions for maintaining said depressurization and said pressurization until activation of said first valve means.

32. A manually operated, manually powered, portable device for capturing small objects in the form of a hand held, substantially pistol shaped unit, said unit comprising:
- a housing having a handle, a barrel, and a muzzle, means for pressure and vacuum storage in said housing, said means including a portion of said barrel;
- a trigger means mounted to said housing;
- a pump means being a portion of said unit and communicating with said portion of said barrel for pressurizing and for depressurizing said barrel portion relative to the pressure at said muzzle; and
- means including a valve between said barrel portion and said muzzle and linked to said trigger means for substantially preventing fluid flow between said barrel portion and said muzzle when said valve is closed during said pressurization and said depressurization and for substantially instantaneously substantially equalizing the pressure in said barrel portion with the pressure at said muzzle when said valve is opened by manual activation of said trigger means after said pressurizing and after said depressurizing.

33. A capturing device as in claim 32 wherein said opening of said valve by manual activation of said triigger means is independent of the operation of said pump means.

34. A capturing device as in claim 32 further including a spring means linked to said valve means for closing said valve upon deactivating said trigger means.

35. A capturing device as in claim 32 further including a catch chamber in said barrel behind said valve means for trapping a captured object.

36. A capturing device as in claim 35 wherein the length of barrel between said muzzle and said catch chamber has a substantially constant cross-section, whereby ejection of a captured object is facilitated.

37. A capturing device as in claim 32 further including a chamber means external to said barrel portion for increasing the pressure or suction capacity of said device.

38. A capturing device as in claim 32 wherein said pressure or vacuum storage means includes a chamber of said pump means.

39. A capturing device as in claim 32 wherein said pressure or vacuum storage means primarily consists of a chamber of said pump means.

40. A capturing device as in claim 32 wherein said pressure or vacuum storage means includes a chamber within said handle and communicating with said barrel portion.

41. A capturing device as in claim 32 further including means for repeatedly operating said pump means, whereby said pressurization or depressurization is augmented.

42. A manually operated, manually powered, protable device for capturing small objects in the form of a hand held unit, said unit comprising:
- a housing including an internal chamber means for pressure and vacuum storage;
- aperture means in said housing for connecting said internal chamber means with the atmosphere;
- pump means being a portion of said unit and communicating with said internal chamber means for pressurizing and for depressurizing said internal chamber means relative to the pressure of the atmosphere external to said aperture means;
- and valve means in said aperture means for blocking flow through said aperture means during said pressurizing and during said depressurizing and for substantially instantaneously and substantially completely equalizing the pressure in said internal chamber means with said external pressure after said pressurizing and after said depressurizing by substantially instantaneously and substantially completely unblocking said aperture means when manually activated.

43. A capturing device as in claim 42 further including means for activating said valve means independently of the operation of said pump means.

44. A capturing device as in claim 42 further including means for reblocking said aperture means after said manual activation of said valve means.

45. A capturing device as in claim 42 wherein said internal chamber means includes a chamber of said pump means.

46. A capturing device as in claim 42 wherein said internal chamber means primarily consists of a chamber of said pump means.

47. A capturing device as in claim 42 further including means for repeatedly operating said pump means prior to manual activation of said valve means, whereby said pressurization or depressurization is augmented.

48. A capturing device as in claim 42 further including means for activating said valve means after said pressurization or depressurization has been completed and said pump means is no longer being operated.

49. A manually operated, manually powered, portable device for capturing small objects in the form of a hand held unit, said unit comprising:
   a housing including an internal chamber means for vacuum storage;
   aperture means in said housing for connecting said internal chamber means with the atmosphere;
   pump means being a portion of said unit and communicating with said internal chamber means for depressurizing said internal chamber means relative to the pressure external to said aperture means to create a partial vacuum in said internal chamber means;
   first valve means in said aperture means for blocking said aperture means during said depressurization and for substantially instantaneously substantially equalizing the pressure in said internal chamber means with said external pressure by substantially instantaneously substantially completely unblocking said aperture means when manually activated; and
   means for activating said first valve means after said depressurization has been accomplished and while said pump means is not being operated.

50. An object capturing device as in claim 49 wherein said activation means includes a manually operated trigger which releases a spring loaded hammer, said hammer striking a working member of said first valve means and rapidly carrying said member in a direction resulting in said unblocking.

51. An object capturing device as in claim 49 wherein said aperture means includes a filter means providing a filter area substantially greater than the cross-sectional area of the aperture means.

52. An object capturing device as in claim 51 wherein said filter means includes a substantially cylindrical portion which forms a substantial bore portion of said aperture means.

53. A capturing device as in claim 49 wherein said first valve means comprises a valve controlled by means of a manually operated trigger mechanism.

54. A capturing device as in claim 49 wherein said pump means further includes means for pressurizing said internal means relative to the pressure external to said aperture means, whereby said activation of said first valve means after said pressurization of said internal chamber means provides a pressure pulse in said aperture means for ejecting a captured object.

55. A capturing device as in claim 49 wherein said first valve means comprises a shutter valve having a shutter for blocking said aperture means and wherein said activating means comprises trigger means mounted to said housing for moving said shutter suddenly and rapidly so as to accomplish said unblocking.

56. A capturing device as in claim 49 wherein said internal chamber means includes a chamber of said pump means.

57. An object capturing device as in claim 49 wherein said internal chamber means primarily consists of a chamber of said pump means.

58. An object capturing device as in claim 49 wherein said housing is substantially pistol shaped, having a handle, a barrel and a muzzle, and wherein said internal chamber means includes a chamber within said handle.

59. An object capturing device as in claim 49 wherein said pump means further includes means for pressurizing said internal chamber means relative to the pressure external to said aperture means.

60. An object capturing device as in claim 59 wherein said pressurizing and depressurizing means are manually selectable.

61. The device of claim 2 wherein said trigger means includes a combination spring hammer which engages a valve stem of said shutter valve for accomplishing said unblocking.

62. A capturing device as in claim 61 wherein said trigger means further includes a combination spring trigger releasing said spring hammer in response to finger pressure on said spring trigger.

* * * * *